Sept. 7, 1943.  J. C. COX  2,328,619
BRAKING MECHANISM
Filed March 9, 1942  2 Sheets-Sheet 2
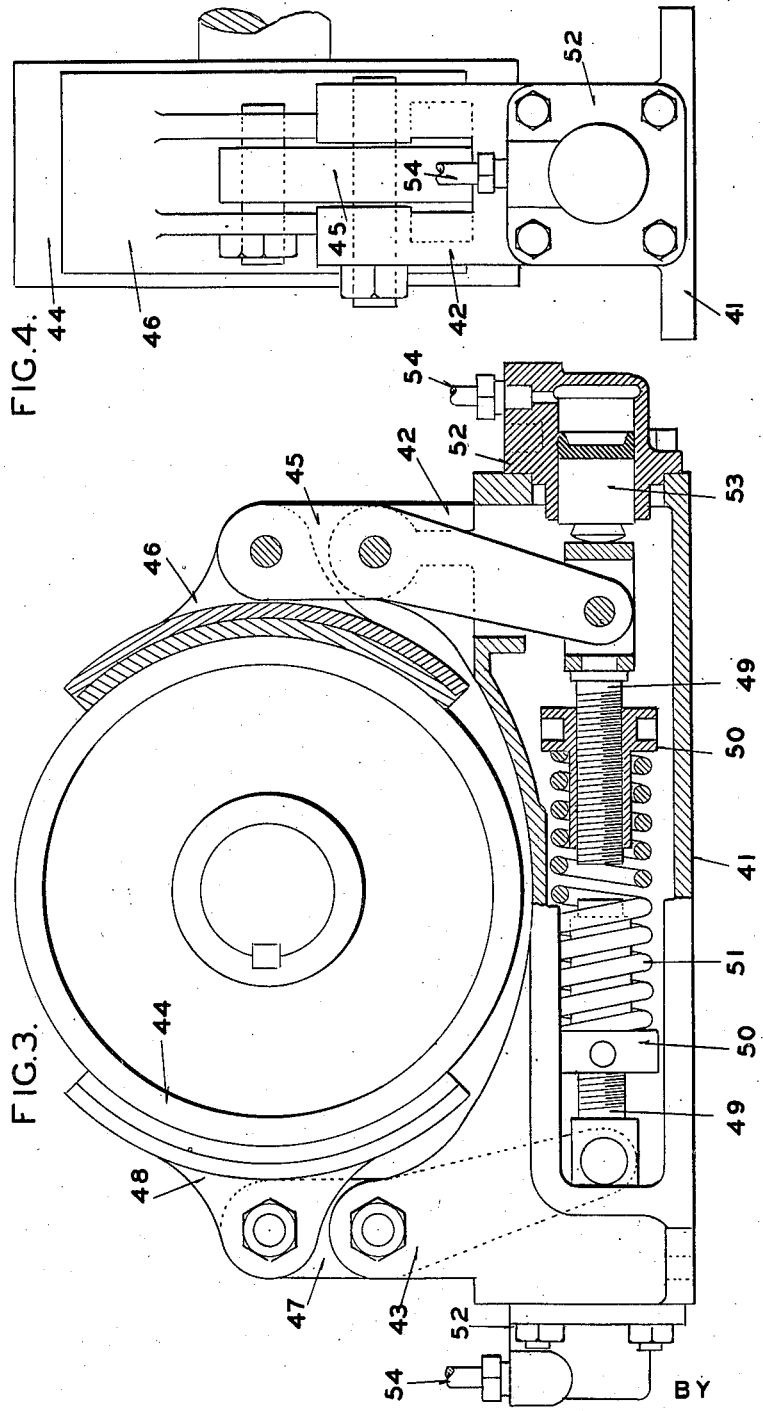
INVENTOR
JOHN C. COX
BY
ATTORNEY Patented Sept. 7, 1943

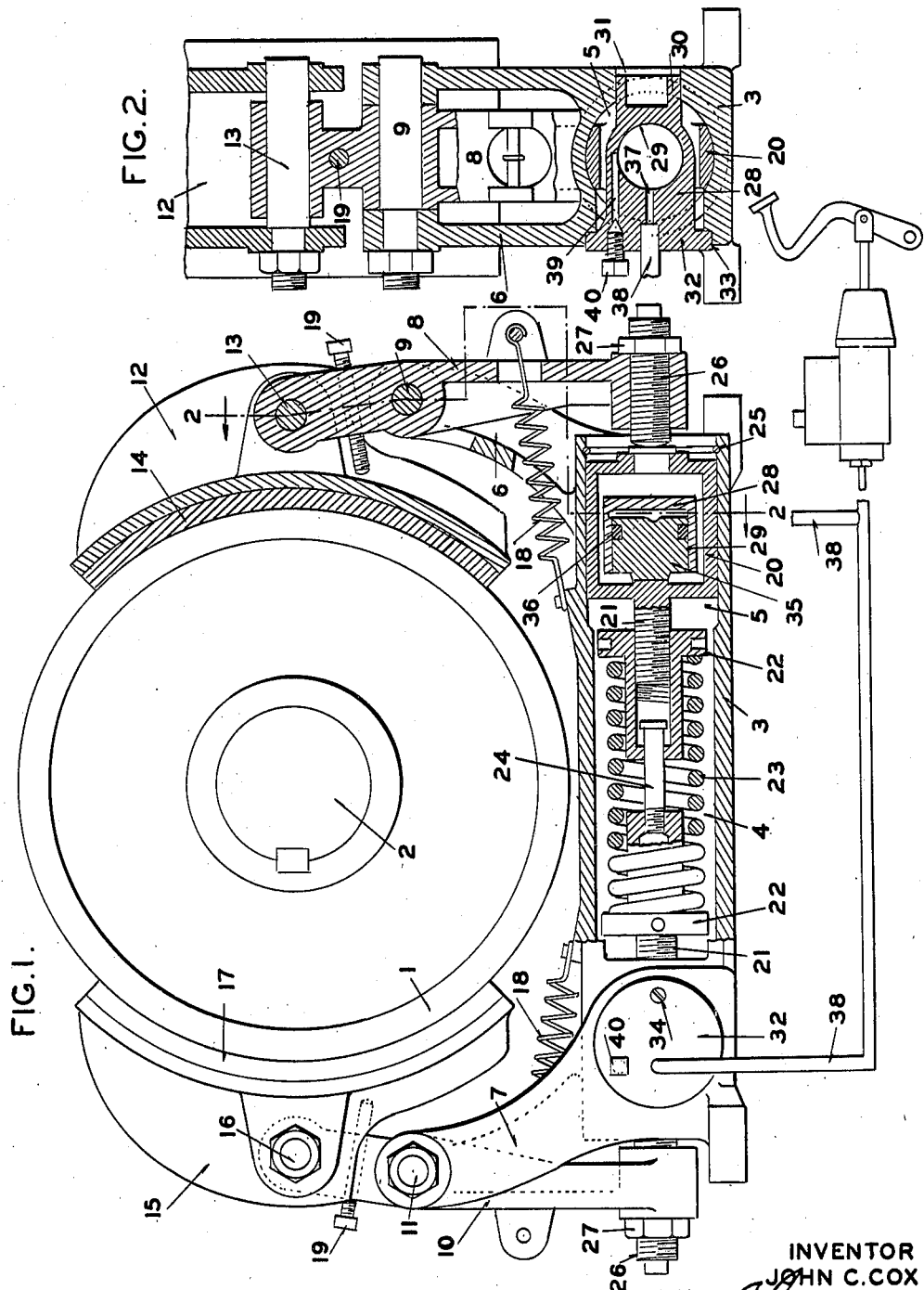

2,328,619

UNITED STATES PATENT OFFICE 2,328,619

BRAKING MECHANISM

John C. Cox, Ladue, Mo., assignor to Wagner Electric Corporation, St. Louis, Mo., a corporation of Delaware Application March 9, 1942, Serial No. 433,896

13 Claims. (Cl. 188—170)

My invention relates to braking mechanism and more particularly to a braking mechanism for use on industrial equipment such as cranes, hoists, and so forth.

One of the objects of my invention is to produce an improved braking mechanism in which the friction elements are applied by a spring and released by the action of fluid pressure actuated means.

Another object of my invention is to construct an improved spring set brake for industrial use in which the actuating spring and the releasing means for nullifying the spring applying force are positioned in or so associated with the base of the brake as to result in a very compact braking assembly which can be installed in a minimum space.

Still another object of my invention is to produce an industrial brake which will be easily controllable, efficient in operation, economical to manufacture, and so constructed as to be readily assembled when newly constructed and also readily disassembled in the event repair is required.

Other objects of my invention will become apparent from the following description taken in connection with the accompanying drawings in which Figure 1 is a view of a braking mechanism embodying my invention, parts being shown in section; Figure 2 is a sectional view taken on the line 2—2 of Figure 1; Figure 3 is a view, partly in section, of another braking mechanism also embodying my invention but showing a slightly different construction; and Figure 4 is an end view of the braking mechanism shown in Figure 3.

Referring to Figures 1 and 2, numeral 1 indicates a brake drum secured to a shaft 2 which is to be braked. Positioned beneath the drum is a base member 3 upon which the brake shoe and control mechanism are all carried in order to produce a unitary structure, said base member being capable of being secured to any suitable supporting structure. The base member is of general hollow construction with its central portion 4 open at its sides and its end portions provided with cylinders 5. Extending upwardly from the ends of the base member and positioned on each side of the brake drum are integral portions 6 and 7.

The integral portion 6 mounts a lever 8 by means of a pivot pin 9 and portion 7 mounts a similar lever 10 by a pivot pin 11. The upper end of lever 8 carries a brake shoe 12 by means of a pivot pin 13 and this brake shoe is provided with a lining 14 for cooperation with the drum. The upper end of lever 10 also carries a brake shoe 15 by means of a pivot pin 16, said shoe being provided with lining 17 for cooperation with the drum. Between each lever and the base there is provided a retracting spring 18. In order to prevent the brake shoes from dragging on the brake drum when the shoes are released, each lever is provided with an adjustable bolt 19 acting as a stop for limiting pivotal movement of the shoe.

Each cylinder 5 of the base has slidably mounted therein a hollow member 20 provided with a threaded extension 21 extending inwardly into the central open portion of the base. On each extension is screwed a combined stop and adjusting member 22 and interposed between these members is a strong coil spring 23. A bolt 24 extends between the adjusting members in order to provide means for holding said members from completely separating and to originally place the spring under compression prior to assembly, said bolt, however, not interfering with the normal operation of the spring after the adjusting members 22 have been adjusted toward each other in order to take the load of the spring. The extreme ends of the cylinders 5 are provided with stops 25 in order to limit the outward movements of the hollow members 20, said stops being in the form of snap rings.

The member 20 at the right end of the base, as viewed in Figure 1, is adapted to cooperate with the lower end of lever 8, and the member 20 at the left end of the base is adapted to cooperate with lever 10. Each of the levers is provided with an adjustable screw 26 for providing adjustment between it and member 20 with which it cooperates. Lock nuts 27 are employed to hold the adjusting screws in their adjusted positions.

Each end of the base member carries a member 28 which is positioned in hollow member 20 and formed in member 28 is a cylinder 29 having an open end adjacent the end of the member 20 provided with the threaded extension 21. Each member 28 is so constructed as to be readily removed from the base. The member on one side of cylinder 29 is provided with a portion 30 fitting into an opening 31 in one side of cylinder 5. The other side of member 29 has a head 32 fitting into an opening 33 in the opposite side of the cylindrical portion 5. A screw 34 holds member 28 is proper position. Slidable in each cylinder 29 of member 28 is a piston 35 which is adapted to abut the end wall of the hollow member 20 in which member 28 is positioned. The pistons carry suitable packing 36 to prevent leakage. Each member 28 is provided with an inlet passage 37 for its cylinder, which passage is connected to a conduit 38 leading to a common source of hydraulic pressure which may be a master cylinder device or a pump. A master cylinder device is shown by way of example. Each member 28 is also provided with a bleed passage 39 for the cylinder, the outer end of said passage being closed by the threaded plug 40.

The braking mechanism, as shown in Figure 1, is in applied condition, being held applied by the strong coil spring 23. With the adjustments shown it is seen that when the brake is applied, the hollow members 20 are spaced some distance from stops 25 in the ends of the cylindrical portion of the base. The bolt 24 between the adjusting members 22 does not interfere with the application of force from the spring to the lower ends of levers 8 and 10.

When it is desired to release the brake, fluid under pressure from the source is simultaneously developed in cylinders 28, thereby causing pistons 35 to move inwardly toward each other. These movements of the pistons will cause the hollow members 20 and the adjusting members 22 to also be moved inwardly. This will compress the coil spring 23 and prevent said spring from transmitting any force to the lower ends of levers 8 and 10. As the hollow members 20 move away from the levers, springs 18 will become effective to rotate the levers so that the shoes mounted on the upper ends thereof will be moved away from the drum to thereby release the brake. When the brake is released, the upper ends of the brake shoes will be prevented from dragging on the drum by their cooperation with the adjustable bolts 19. To apply the brake the fluid pressure need only be released. This permits the spring 23 to again apply force to the lower ends of the levers and thereby place the brake shoes in engagement with the drum.

In assembling the actuating mechanism in base member 3, the adjusting members 22 are first associated with the ends of the spring and then the spring is compressed so that bolt 24 can be placed in position to connect members 22. The spring will now be held under some tension. The spring and the adjusting members 22 are now placed in the central portion of the hollow base and the members 20 attached to the adjusting members 22 by screwing each extension 21 into an adjusting member. Members 20 are screwed sufficiently into the adjusting members as to permit stops 25 to be placed in position. Next, each member 28 carrying its piston is mounted in the base and levers 8 and 10 mounted in position. Next, the adjusting members 22 are screwed toward each other in order to further compress the spring and take the load off bolt 24. Following this the adjusting screws 26 at the lower ends of the levers are screwed up in order to move members 20 inwardly and in spaced relation to their stops 25. The brake will now be properly adjusted and in applied position. As the linings of the brake shoes wear, a point will be reached where the hollow members 20 may engage the stops before the desired pressure is applied to the brake shoes. This will inform the operator that an adjustment for lining wear should be made. This is accomplished by merely screwing up the adjustable screws 26 at the lower ends of the levers in order to re-establish a space between each member 20 and its stop.

From the foregoing description of the brake it is obvious that a very compact and efficient industrial brake has been produced. All of the actuating parts are embodied in the base member of the brake upon which the brake shoes are mounted. The over-all width of the brake is the same as the distance between the outer edges of the brake shoes. With this compact construction the brake can be placed in a much smaller space than would be possible where the actuating mechanism is so positioned that the brake will have a greater over-all length than the distance between the outer edges of the brake shoes. It is also apparent that adjustment for lining wear is very easily accomplished as it requires only the setting up of two screws which are very accessible. There is no necessity for making any adjustment of the main brake applying coil spring unless a greater applying force is required. Also, if it is necessary to repair the brake as, for example, to replace the packing cups on the pistons, the pistons may be removed without removal of the coil spring or the brake shoes and their actuating levers. The members 28, which carry the pistons may be separately removed by merely loosening a screw and pulling the members out of the base. The original assembly of the parts of the brake is also facilitated by the construction. The replacement of coil spring 23 is also easily accomplished when found necessary.

In Figures 3 and 4 I have shown a slightly different construction which is particularly well adapted for smaller types of brakes. In this construction the main applying spring and the fluid actuating motors for releasing the brake shoes are also all associated with the base of the brake upon which the shoes and the actuating levers are mounted. The base 41 is of hollow construction and is provided with integral portions 42 and 43 extending upwardly on each side of the drum 44. The portion 42 has pivoted thereto a lever 45 and on its upper end is pivoted the brake shoe 46 for cooperation with the drum. The portion 43 has pivotally mounted thereon the lever 47 and on its upper end is pivoted the brake shoe 48. The lower ends of the levers extend downwardly into the ends of the hollow base 41. The lower end of each lever is pivoted to a force transmitting member 49 provided with a threaded portion upon which an adjustable member 50 is threaded. Between the adjustable members 50 is a strong coil spring 51 for forcing the levers outwardly and applying the brake shoes 46 and 48 to the drum.

Each end of the base member has secured thereto a cylinder 52 in which is reciprocable a piston 53 for engaging a member 49 to thus push the members 49 inwardly, compress the spring, and cause the levers to disengage the shoes from the drum. Each cylinder communicates with a conduit 54 and both conduits are connected to a common source of pressure (not shown) so that the pistons can be simultaneously actuated.

The braking mechanism, as shown in Figures 3 and 4, is in applied condition, the applying force being obtained from the strong coil spring 51. When it is desired to release the brakes, fluid under pressure is developed in cylinders 52 from the common source, thereby moving pistons 53 inwardly, compressing spring 51 and actuating the levers in order to disengage the brake shoes from the drum. When the fluid pressure is released, the spring will again apply force to the levers and engage the shoes with the drum.

It is to be noted in the construction shown in Figures 3 and 4 that the fluid pressure releasing motors are on the outside of the levers but are so attached to the base member that the cylinder and piston can be removed as a unit in the event of any necessity for repair. No springs are required to release the shoes from the drum as the levers are directly actuated by the pistons of the fluid motors. No adjustment is necessary for lining wear as the pistons of the fluid motors have sufficient free travel that the entire lining, which is not as thick as that of the brake shoes of Figure 1, will become completely worn out before the pistons abut the ends of their cylinders. If it is desired to place the spring under greater compression, this can be done at any time by screwing the adjusting members 50 toward each other.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism, a brake drum, a base member positioned beneath the drum and having parts extending upwardly on each side of the drum, a lever pivoted intermediate its ends to each part, a brake shoe mounted on the upper end of each lever for cooperation with the drum, a compressed coil spring positioned beneath the drum within the outlines of said base member and between the lower ends of the levers, means for so connecting the ends of the coil spring to the lower ends of the levers that said spring applies a spreading force to said lever ends to thereby apply the brake shoes to the drum, and means comprising a fluid motor mounted on each end of the base member for applying opposing forces to the ends of the spring to thereby compress the spring and relieve the shoes of their applying forces, said spring being positioned between the motors and said spring and motors all being in axial alignment.

2. In braking mechanism, a brake drum, a hollow base member positioned beneath and closely adjacent the drum and having integral portions extending upwardly on each side of the drum, a lever pivoted intermediate its end on each portion, a shoe pivoted on the upper end of each lever for cooperation with the drum, means comprising a compressed coil spring positioned in the hollow portion of the base member and between the lower ends of the levers for moving said lower ends of the levers outwardly to apply the shoes to the drum, and fluid motors associated with the ends of the spring for additionally compressing it to thereby relieve the shoes of their applying forces, said spring being positioned between the motors and said spring and motors all being in axial alignment.

3. In braking mechanism, a brake drum, a base member positioned beneath the drum and having parts extending upwardly on each side of the drum, a lever pivoted intermediate its ends to each part, a brake shoe mounted on the upper end of each lever for cooperation with the drum, a compressed coil spring positioned beneath the drum within the outlines of said base member and between the lower ends of the levers, means for so connecting the ends of the coil spring to the lower ends of the levers that said spring applies a spreading force to said lever ends to thereby apply the brake shoes to the drum, means comprising a fluid motor mounted on each end of the base member for applying opposing forces to the ends of the spring to thereby compress the spring and relieve the shoes of their applying forces, said spring being positioned between the motors and said spring and motors all being in axial alignment, and means embodied in the connections between the ends of the coil spring and the lower ends of the levers for adjusting the spring and varying the forces by which the shoes are applied.

4. In braking mechanism, a brake drum, a base member positioned beneath the drum, a lever pivoted intermediate its ends to each end of the base member, said levers having their lower ends positioned opposite the ends of the base member, a shoe mounted on the upper end of each lever, means comprising a compressed coil spring interposed between the lower ends of the levers for moving them outwardly to thereby apply the brake shoes, and means comprising fluid motors for additionally compressing the spring and relieving the levers of their brake applying forces, both said spring and motors being positioned within the outlines of the base member and having aligned axes.

5. In a braking mechanism, a brake drum, a base member positioned beneath the drum and having parts extending upwardly on each side of the drum, a lever pivoted intermediate its ends to each part, a brake shoe mounted on the upper end of each lever for cooperation with the drum, a compressed coil spring positioned beneath the drum within the outlines of said base member and between the lower ends of the levers, means for so connecting the ends of the coil spring to the lower ends of the levers that said spring applies a spreading force to said lever ends to thereby apply the brake shoes to the drum, means comprising a fluid motor mounted on each end of the base member with their axes aligned with the spring and capable of applying opposing forces to the ends of the spring to thereby compress the spring and relieve the shoes of their applying forces, means for limiting the movement of the levers by the spring, and means for adjusting the connection between the ends of the spring and the lower ends of the levers.

6. In braking mechanism, a brake drum, a base member positioned beneath the drum and having parts extending upwardly on each side of the drum, said base member being provided with aligned cylinders at opposite ends thereof, a lever pivoted intermediate its ends to each part, the lower end of each lever lying outside a cylinder of said base, a brake shoe mounted on the upper end of each lever for cooperation with the drum, a member slidable in each cylinder and operatively connected to the lower end of a lever, a compressed coil spring between and axially aligned with said last named members for forcing the lower ends of the levers outwardly and thereby apply the brake shoes, adjustable means between the lower ends of the levers and the members, and means for additionally compressing the spring to relieve the shoes of applying forces.

7. In braking mechanism, a brake drum, a base member positioned beneath the drum and having parts extending upwardly on each side of the drum, said base member being provided with aligned cylinders at opposite ends thereof, a lever pivoted intermediate its ends to each part, the lower end of each lever lying outside a cylinder of said base, a brake shoe mounted on the upper end of each lever for cooperation with the drum, a member slidable in each cylinder and operatively connected to the lower end of a lever, a compressed coil spring between and axially aligned with said last named members for forcing the lower ends of the levers outwardly and thereby apply the brake shoes, means for operating the slidable members and further compressing the coil spring, and a spring cooperating with each lever for retracting the shoes from the drum when the first named spring is compressed by the operation of the slidable members.

8. In braking mechanism, a brake drum, a base member positioned beneath the drum and having parts extending upwardly on each side of the drum, said base member being provided with aligned cylinders at opposite ends thereof, a lever pivoted intermediate its ends to each part, the lower ends of said levers lying adjacent the ends of the cylinders of said base, a brake shoe mounted on the upper end of each lever for cooperation with the drum, a member having an open central portion slidable in each cylinder and each adapted to cooperate with the lower end of a lever, a compressed coil spring interposed between said last named members for forcing the lower ends of the levers outwardly to thereby apply the brake shoes, and fluid motors for applying opposing forces to said members to thereby compress the spring, each motor comprising a cylinder and piston carried by one end of the base member and lying within the open central portion of a slidable member.

9. In braking mechanism, a brake drum, a base member positioned beneath the drum and having parts extending upwardly on each side of the drum, said base member being provided with aligned cylinders at opposite ends thereof, a lever pivoted intermediate its ends to each part, the lower ends of said levers lying adjacent the ends of the cylinders of said base, a brake shoe mounted on the upper end of each lever for cooperation with the drum, a member having an open central portion slidable in each cylinder and each adapted to cooperate with the lower end of a lever, a compressed coil spring interposed between said last named members for forcing the lower ends of the levers outwardly to thereby apply the brake shoes, and fluid motors for applying opposing forces to said members to thereby compress the spring, each of said motors comprising a member extending across one end of the base member and having a portion provided with a cylinder lying within the open central portion of a member and a piston in the cylinder for engaging the inner end of the hollow member.

10. In braking mechanism, a brake drum, a base member positioned beneath the drum and having parts extending upwardly on each side of the drum, a lever pivoted intermediate its ends to each part, a brake shoe mounted on the upper end of each lever for cooperation with the drum, a compressed coil spring positioned beneath the drum within the outlines of said base member and between the lower ends of the levers, means for so connecting the ends of the coil spring to the lower ends of the levers that said spring applies a spreading force to said lever ends to thereby apply the brake shoes to the drum, and a fluid motor mounted on each end of the base and having its movable member operatively connected to the adjacent lower end of a lever, said fluid motors being positioned on the outer sides of the lower ends of the levers and when actuated causing the spring to be additionally compressed and the lever operated to release the brake shoes.

11. In braking mechanism, a brake drum, a hollow base member positioned beneath the drum and having parts extending upwardly on each side of the drum, a lever pivoted intermediate its ends to each part, the lower end of each lever extending into the adjacent hollow end of the base member, a brake shoe mounted on the upper end of each lever for cooperation with the drum, a spring positioned in the central portion of the base member and between the lower ends of the levers, means for connecting the ends of the springs to the levers, and a fluid pressure-actuated motor mounted on each end of the base member and on the outer side of the lower end of the adjacent lever, said motors and spring being in axial alignment.

12. In braking mechanism, a brake drum, an open-sided hollow base member positioned beneath the drum and having parts extending upwardly on each side of the drum, a lever pivoted intermediate its ends to each part, the lower end of each lever extending into the adjacent hollow end of the base member, a brake shoe mounted on the upper end of each lever for cooperation with the drum, a spring positioned in the central portion of the base member and between the lower ends of the levers, means for connecting the ends of the spring to the levers, a fluid pressure-actuated motor mounted on each end of the base member and on the outer side of the lower end of the adjacent lever, and means for adjusting the normal compressed condition of the spring, said last named means being accessible from the exterior of the base through the open side.

13. In braking mechanism, a brake drum, a base member positioned beneath the drum and having parts extending upwardly on each side of the drum, a lever pivoted intermediate its ends to each part, a brake shoe mounted on the upper end of each lever for cooperation with the drum, a compressed coil spring positioned beneath the drum within the outlines of said base member and between the lower ends of the levers, means for so connecting the ends of the coil spring to the lower ends of the levers that said spring applies a spreading force to said lever ends to thereby apply the brake shoes to the drum, and means comprising fluid pressure actuated means also positioned within the outlines of the base member with the movable means thereof axially aligned with the spring and capable of applying opposing forces to the ends of the spring to thereby compress the spring and relieve the shoes of their applying forces.

JOHN C. COX.